(12) United States Patent
Uchida

(10) Patent No.: US 8,962,098 B2
(45) Date of Patent: Feb. 24, 2015

(54) METHOD OF MANUFACTURING BATTERY ELECTRODE AND COATING DIE FOR USE THEREIN

(75) Inventor: Yozo Uchida, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 553 days.

(21) Appl. No.: 13/132,707

(22) PCT Filed: Apr. 22, 2009

(86) PCT No.: PCT/JP2009/001835
§ 371 (c)(1),
(2), (4) Date: Jun. 3, 2011

(87) PCT Pub. No.: WO2010/122601
PCT Pub. Date: Oct. 28, 2010

(65) Prior Publication Data
US 2011/0244144 A1    Oct. 6, 2011

(51) Int. Cl.
*H01M 4/139*    (2010.01)
*B05C 5/00*    (2006.01)
(Continued)

(52) U.S. Cl.
CPC .................. *H01M 4/139* (2013.01); *B05D 1/26* (2013.01); *B05D 3/06* (2013.01); *H01M 4/0404* (2013.01);
(Continued)

(58) Field of Classification Search
USPC ......... 427/541, 542, 543, 544, 596, 553, 554, 427/557; 118/642, 643
See application file for complete search history.

(56) References Cited

U.S. PATENT DOCUMENTS 3,900,593 A * 8/1975 Herczog et al. ............... 427/541
3,974,016 A * 8/1976 Bondybey et al. .......... 156/272.8
(Continued)

FOREIGN PATENT DOCUMENTS

CN    1224250    7/1999
CN    1532054    9/2004
(Continued)

OTHER PUBLICATIONS

Sea Water. Light Absorption by Water Molecules and Inorganic Substances Dissolved in Sea Water. Springer, 2007, pp. 11-81.*
(Continued)

*Primary Examiner* — Dah-Wei D Yuan
*Assistant Examiner* — Jose Hernandez-Diaz
(74) *Attorney, Agent, or Firm* — Finnegan, Henderson, Farabow, Garrett & Dunner, LLP

(57) ABSTRACT

The objective of the present invention is to provide an unexpected method of manufacturing a battery electrode and a coating die for use therein, both of which are capable of providing a high speed drying and of improving a peel strength between a collector and a compound. The manufacturing process S1 of manufacturing the battery electrode 1 includes the process of coating the compound 3 containing the electrode active material 4 and the binder 5 on the sheet collector 2 and the process of drying the compound 3 to bond the collector 2 and the compound 3, wherein in the coating process, a laser light is emitted to the interface between the compound 3 and the collector 2. Due to the above structure, regardless of the drying speed, the binder 5 contained in the compound 3 is crystallized at the interface with respect to the collector 2. As a result, the high speed drying is provided and the peel strength between the collector 2 and the compound 3 is improved.

5 Claims, 1 Drawing Sheet

(51) Int. Cl.
    *B05D 3/06* (2006.01)
    *H01M 4/04* (2006.01)
    *B05D 1/26* (2006.01)
    *B05C 5/02* (2006.01)

(52) U.S. Cl.
    CPC ......... *H01M 4/0409* (2013.01); *H01M 4/0411* (2013.01); *B05C 5/0254* (2013.01); *Y02E 60/122* (2013.01)
    USPC ........... 427/541; 118/643; 118/620; 427/554; 427/596; 427/58

(56) References Cited

U.S. PATENT DOCUMENTS

| | | | |
|---|---|---|---|
| 4,185,185 A * | 1/1980 | Adlam | 219/121.85 |
| 4,644,127 A * | 2/1987 | La Rocca | 219/121.84 |
| 4,810,525 A * | 3/1989 | Morita et al. | 427/597 |
| 6,241,790 B1 | 6/2001 | Matsubara et al. | |
| 6,797,316 B2 * | 9/2004 | Kinoshita et al. | 427/115 |
| 7,147,674 B1 | 12/2006 | Zhong et al. | |
| 2004/0226929 A1 | 11/2004 | Miura et al. | |
| 2007/0097198 A1 * | 5/2007 | Iwata | 347/102 |
| 2011/0086164 A1 * | 4/2011 | Lang et al. | 427/58 |

FOREIGN PATENT DOCUMENTS

| | | |
|---|---|---|
| EP | 0 924 783 | 6/1999 |
| EP | 1 452 326 | 9/2004 |
| JP | 10-188961 | 7/1998 |
| JP | 2000-323129 | 11/2000 |
| JP | 2000-353514 | 12/2000 |
| JP | 2002-50347 | 2/2002 |
| JP | 2006-136762 | 6/2006 |
| JP | 2007-52934 | 3/2007 |
| JP | 2009-37893 | 2/2009 |
| JP | 2009037893 A * | 2/2009 |

OTHER PUBLICATIONS

JP 2009-037893A machine translation provided.*
International Search Report in International Application No. PCT/JP2009/001835; Mailing Date: Sep. 29, 2009.

* cited by examiner

METHOD OF MANUFACTURING BATTERY ELECTRODE AND COATING DIE FOR USE THEREIN

CROSS-REFERENCE TO RELATED APPLICATIONS

This application is a national phase application of International Application No. PCT/JP2009/001835, filed Apr. 22, 2009, the contents of which are incorporated herein by reference.

TECHNICAL FIELD

The present invention relates to a method of manufacturing a battery electrode and a coating die for use in the method, and particularly to a technique of coating a paste compound on a collector, both of which are the composition of the battery electrode.

BACKGROUND ART

The battery electrode for lithium-ion rechargeable battery, nickel metal hydride, or nickel-cadmium rechargeable battery is made by coating a paste compound containing an active material, a binder, a conductive additive and the like on the collector, and drying it (e.g., see Patent Literature 1).

In the field of this art, it is required to dry the compound quickly, to shorten the cycle time of the process in which the electrodes are manufactured for the purpose of improvement of the battery productivity and to reduce the running cost of the drying equipment.

When the conventional drying process is performed at high speed to meet the requirement of the drying speed, the convection (migration) occurs in the compound, and the binder that is lighter than the active material moves upward in the compound (in other words, is separated from the collector). As a result, the peel strength between the collector and the compound is weakened.

[Patent Literature 1] JP 2000-353514 A

SUMMARY OF INVENTION

Technical Problem

The objective of the present invention is to provide an unexpected method of manufacturing a battery electrode and a coating die for use therein, both of which are capable of providing a high speed drying and of improving a peel strength between a collector and a compound.

Solution to Problem

The first aspect of the present invention is a method of manufacturing a battery electrode, which includes a process of coating a compound containing an electrode active material and a binder on a sheet collector and a process of drying the compound to bond the collector and the compound, wherein in the coating process, a laser light is emitted to the compound.

In the advantageous embodiment of the present invention, the laser light is emitted to an interface between the compound and the collector.

In the preferable embodiment of the present invention, the compound is pasted with water, and the laser light has a wavelength resonant with the water The second aspect of the present invention is a coating die for use in the coating process, which includes a manifold temporarily storing the compound, and a laser oscillator emitting the laser light, located near the manifold.

Advantageous Effect

The present invention provides the high speed drying and improves the peel strength between the collector and the compound.

Figure 1:
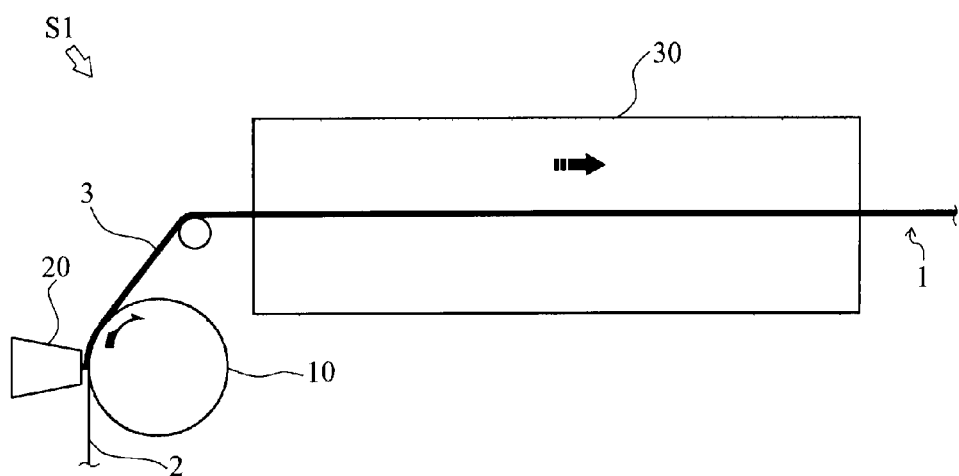
FIG. 1 depicts a manufacturing process of a battery electrode.

REFERENCE SIGNS LIST electrode (battery electrode)
2 collector
3 compound
10 roller
20 coating die
24 laser oscillator Description Of Embodiments An electrode 1 as one embodiment of the battery electrode according to the present invention is described below, referring attached drawings. The electrode 1 is a positive or negative electrode used for a battery such as a lithium-ion rechargeable battery, a nickel metal hydride, or a nickel cadmium rechargeable battery.

As shown in FIG. 1, the electrode 1 is manufactured by preparing a sheet collector 2 having one side (or both sides) coated with a compound 3, drying the compound 3 to bond the collector 2 with the compound 3, and machine-processing suitably such as roll pressing.

The collector 2 is a collecting element made of a metal sheet, and, for example, the aluminum sheet is used for the positive electrode and the copper sheet is used for the negative electrode in the lithium-ion rechargeable battery.

The compound 3 is a paste material, and contains an electrode active material (a positive active material or a negative active material) 4, a binder 5, a thickening agent 6 and a conductive additive. More particularly, the compound 3 is an electrode material, in which the above-mentioned components are mixed uniformly with water or organic solvent and formed as a paste.

The active material 4 is an electrochemical reaction material of the positive or negative electrode of the battery, and the chemical reaction in the active material 4 causes charging and discharging of the battery. The positive active material may be $LiMPO_4$ or $LiMO_2$ as a compound oxide of lithium and transition metal, and the negative active material may be graphite or amorphous carbon.

The binder 5 is a material to give form stability to the active material 4 and to bind the active material 4 and the collector 2 together. The binder 5 may be SBR (styrene-butadiene rubber) for aqueous solvent and PVDF (polyvinylidene difluoride) for organic solvent, both of which are one of high polymeric organic compounds having chemical stability and electrochemical stability.

The thickening agent 6 is a material to enhance the dispersion stability of the active material 4 in the mixing process. The thickening agent 6 is, for example, CMC (carboxymethylcellulose).

The conductive additive is a material to enhance the conductivity of the active material 4. The conductive additive has a structural viscosity. The conductive additive may be AB (acetylene black) or CB (carbon black), which is carbon or metal powder having good conductivity.

Note that the components of the compound 3 are not limited in the above materials, and they may be employed in accordance with the application of the electrode 1.

The electrode 1 is manufactured by a manufacturing process S1 that is described below.

As shown in FIG. 1, in the manufacturing process S1, the collector 2 is conveyed with a conveying roller 10, the compound 3 is coated on the surface (coating surface) of the collector 2 by using a coating die 20, and the compound 3 is dried in a drying furnace 30. After drying, the compound 3 is bonded to the collector 2 and the suitable machine processing such as roll pressing is performed, thereby manufacturing the product (electrode 1).

The roller 10 rotates at the predetermined speed, and conveys the collector 2 supporting the back surface (opposite side to the coating surface) thereof. The suitable controller controls the rotating speed of the roller 10, thereby controlling the conveying speed of the collector 2 with the roller 10.

In the embodiment, the conveying speed of the collector 2 with the roller 10 is set in high speed (e.g., 60 (m/min)).

The coating die 20 discharges the compound 3 at the predetermined volume toward the surface of the collector 2, and coats the compound 3 on the collector 2. The coating die 20 is disposed to face the surface of the collector 2 conveyed with the roller 10.

The controller controls the discharge volume of the compound 3 by the coating die 20 and sets in accordance with the rotating speed of the roller 10.

The drying furnace 30 is located along the conveying route of the collector 2 and has a given length of furnace. In the furnace 30, the heated air conditioned at the predetermined temperature and predetermined volume (that is, predetermined heat quantity) is blown to the surface of the collector 2 to heat and dry the compound 3 coated on the collector 2. The controller controls the heat quantity applied from the furnace 30 to the compound 3 so that the compound 3 passed through the furnace 30 contains lower amount of water or organic solvent than the predetermined value.

The drying speed of the compound 3 (i.e., the evaporation rate of water contained in the compound 3) in the furnace 30 depends on the heat quantity applied to the compound 3 in the furnace 30. Further, the passing time through the furnace 30 changes depending on the conveying speed of the collector 2 with the roller 10, so that the conveying speed of the collector 2 in the furnace 30 by using the roller 10 relates to the drying speed of the compound 3. In the furnace 30, the drying speed of the solvent contained in the compound 3 is controlled by the conveying speed of the collector 2 by the roller 20 and the heat quantity applied by the furnace 30.

In the embodiment, considering the productivity and the cost of the electrode 1, the drying speed of the compound 3 in the furnace 30 is set at high speed.

In the embodiment, the feature "the drying speed is set at high speed" means that the drying speed of the compound 3 in the furnace 30 is set larger than the minimum speed, at which migration occurs in the compound 3, and as the drying speed is set at high speed, the migration occurs in the compound 3 when drying the compound 3. Here, the term "migration" means the phenomenon occurred in the drying process of the compound 3, in which the component of the compound 3 such as the binder 5 move around in the compound 3 caused by the convection in the water contained in the compound 3.

Figure 2:
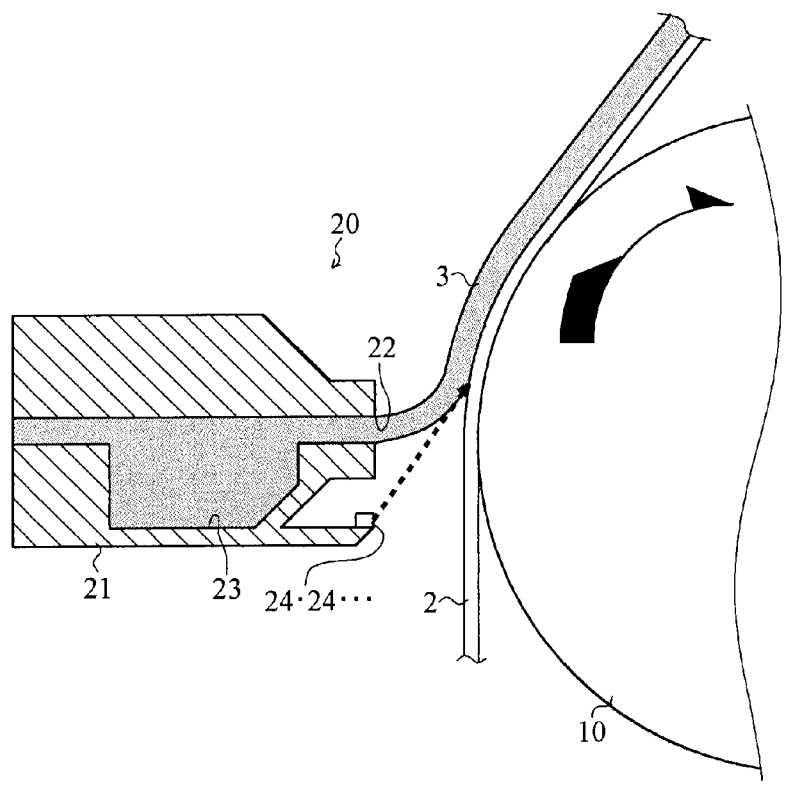
FIG. 2 is an enlarged view of a coating die.

Referring to FIG. 2, the structure of the coating die 20 is described below. The coating die 20 is used for the coating process in the manufacturing process S1, and discharges the compound 3 toward the collector 2, thereby coating the compound 3.

The coating die 20 is made of metal such as stainless steel or aluminum that has high conductivity, and, as shown in FIG. 2, the coating die has a main body 21, a discharge slit 22, a manifold 23, and laser oscillators 24.

The main body 21 is a main structure of the coating die 20.

In the coating die 20, the discharge slit 22 and the manifold 23 are formed in the main body 21, and the laser oscillators 24 are detachably attached to the main body 21.

The discharge slit 22 is a slit opening formed at the tip of the main body 21, which has the predetermined width. Through the discharge slit 22, the compound 3 is discharged. The discharge slit 22 is extended toward the discharge direction from the main body 21.

The manifold 23 is a chamber communicated with the discharge slit 22, in which the compound 3 is temporarily stored. The manifold 23 is built in the main body 21 and has the same width as the discharge slit 22. The compound 3 supplied to the coating die 20 is fed to the discharge slit 22, spreading over the width in accordance with the discharge slit 22 in the manifold 23.

In the embodiment, the compound 3 is supplied to the manifold 23 at the room temperature (25 to 30 degrees Celsius).

The laser oscillator 24 generates a laser light with a predetermined wavelength and emits the laser light, and it is used for the emission of the laser light to the interface between the compound 3 and the collector 2 when the coating die 20 is coating the compound 3. The laser oscillator 24 emits the laser light from the upstream side of the conveying direction of the collector 2 with respect to the discharge slit 22 to the interface between the compound 3 and the collector 2 within the coating area of the compound 3 on the collector 2.

The laser oscillators 24 are attached to the main body 21, arranged in the width direction of the discharge slit 22, all of which are detachable and adjustable in angle and emit the laser light to the interface between the compound 3 and the collector 2 from the gap between the coating die 20 and the collector 2. The emitted spots of the laser light in the compound 3 are locally heated, in which the drying of the compound 3 and the crystallization of the binder 5 are accelerated.

Note that the number of the laser oscillators 24 is not limited, and it may be selected in accordance with the performance thereof such as the output and the emission area and with the embodiment of the coating die 20.

As described above, in the manufacturing process S1, when coating the compound 3 on the collector 2 by using the coating die 20, the laser oscillators 24 emit the laser light toward the interface between the compound 3 and the collector 2, where the compound 3 discharged toward the collector 2 contacts to the collector 2, thereby locally heating the compound 3.

Therefore, the drying of the compound 3 is accelerated at the interface. In other words, the binder 5 sets quickly at the interface among the collector 2, and the binder 5 is easy to exist near the interface between the compound 3 and the collector 2, thereby enhancing the bonding strength of the binder 5 contained in the compound 3 against the collector 2.

As the result of the above feature, the high speed drying is provided and the peel strength between the collector 2 and the compound 3 is improved.

Furthermore, the laser light emitted from each laser oscillator 24 accelerates the drying of the compound 3, so that the drying efficiency is enhanced, thereby shortening the drying time in the furnace 30. The length of the furnace 30 is also reduced.

Further, when coating the compound 3 with the coating die 20, the laser oscillators 24 emit the laser light, thereby drying the compound 3 at the interface with respect to the collector 2, before the compound 3 is entirely dried and just after the coating by using the coating die 20.

When the furnace 30 provides the high speed drying of the compound 3 coated on the collector 2, the migration occurs in the compound 3, especially when the collector 2 is conveyed with the compound 3 being coated on the upper surface of the collector 2, the binder 5 contained in the compound 3 moves to the surface layer of the compound 3 (to the separating direction with respect to the interface between the compound 3 and the collector 2) due to the migration. In the embodiment, the laser lights are emitted to the interface between the compound 3 and the collector 2 just after the coating and accelerate the drying, so that, at the time of high speed drying in the furnace 30, the binder 5 is prevented from separating from the interface with respect to the collector 2 caused by the migration occurred in the compound 3.

As a result, even when the drying speed is larger than the speed at which the migration occurs in the compound 3, the peel strength between the compound 3 and the collector 2 is improved, so that the high speed drying is obtained. In the furnace 30, the improvement in the drying efficiency of the compound 3 brings about the reduction of the drying time or the shortening of the length of the furnace 30, thereby reducing the running cost of the furnace 30.

In the advantageous embodiment, the incident angle of the laser light emitted from each of the laser oscillators 24 is an obtuse angle with respect to the interface between the collector 2 and the compound 3, and more advantageously, the incident angle is approximately right angle with respect to the interface between the collector 2 and the compound 3. In other words, it is preferable that the laser light applied from the each of the laser oscillators 24 makes the larger angle with the surface of the collector 2.

Due to the above setting, the compound 3 absorbs the laser lights efficiently, and the drying efficiency of the compound 3 is improved. Further, the reflection of the laser lights on the collector 2 made of metal foil that has high reflectance is reduced, so that the laser oscillators 24 do not need high output.

In the embodiment, semiconductor lasers or gas lasers may be employed as the laser oscillators 24. In view of the output, the gas laser is preferable, and in view of the cost, the semiconductor laser is preferable.

To the semiconductor lasers, ultraviolet lasers, blue lasers having short lengths and high outputs, infrared lasers having long wavelengths, or the combination of them are applicable. That is, the best lasers can be selected from the above-mentioned lasers, according to the kind of the compound 3 prepared in the manufacturing process S1.

For example, when the blue lasers or the ultraviolet lasers are employed as the laser oscillators 24, the C-C bonds included in the binder 5 of the compound 3 are preferably broken, thereby accelerating the crystallization (polymerization) of the binder 5.

In the embodiment, considering the above-mentioned characteristics, the ultraviolet lasers (wavelength: 405 nm, output: 300 mW, continuous output: 200 mW, pulse output: 450 mW) are employed as the laser oscillators 24.

Additionally, when the compound 3 is the paste with water (i.e., pasted with water as the solvent), the semiconductor lasers having the resonant wavelengths with the water are preferably employed as the laser oscillators 24.

In this case, the laser lights are resonant with the water contained in the compound 3, and the compound 3 is heated efficiently, whereby the output energy of the each laser oscillator 24 is reduced. Such the semiconductor lasers are InGaAsSb lasers having the wavelengths: 2.85 μm.

In the case that the compound 3 is pasted with water and the laser oscillators 24 are the blue lasers or ultraviolet lasers, the laser lights also provide the acceleration of drying of the compound 3.

As shown in FIG. 2, the laser oscillators 24 are attached to the projected portion (the portion extended from the outside of the main body 21 of the coating die 20 and the projecting portion toward the collector 2) of the main body 21 of the coating die 20, and located near the manifold 23.

To the manifold 23, the compound 3 at the room temperature is continuously supplied, so that the compound 3 in the manifold 23 acts as the chiller against the laser oscillators 24. Thus, the heat generated in the laser oscillators 24 that are the electric heating elements is transferred to the main body 21 of the coating die 20, and the compound 3 in the manifold 23 absorbs the heat.

Therefore, without another cooling means, the laser oscillators 24 are efficiently cooled down, thereby preventing the lowering of the output of the laser oscillators 24 caused by the temperature rising.

As the result of the above-mentioned structure, the laser oscillators 24 can keep high performance in output.

Industrial Applicability

The present invention is applicable to the manufacturing process in which the battery electrodes are manufactured, and especially to the manufacturing process including the high speed drying process.

The invention claimed is:

1. A method of manufacturing a battery electrode, comprising:
    coating a compound containing an electrode active material and a binder on a sheet collector using a coating die; and
    drying the compound to bond the collector and the compound,
    wherein in the coating, a laser light is emitted to an interface between the compound and the collector when the coating die is coating the compound, and
    wherein in the drying, a drying speed is set larger than a minimum speed where a migration occurs in the compound.

2. The method according to claim 1,
    wherein the compound is pasted with water, and
    wherein the laser light has a wavelength resonant with the water.

3. A coating die for use in a coating process for coating a battery electrode comprising a sheet collector and a compound containing an electrode active material and a binder, the coating die comprising:
    a manifold temporarily storing the compound, and
    a laser oscillator configured to emit a laser light to an interface between the compound and the sheet collector when the coating die is coating the compound,
    wherein the coating die configured to manufacture the battery electrode.

4. The method of claim 1, wherein the laser light is emitted to the interface between the compound and the collector from a gap between the coating die and the collector.

5. A method of manufacturing a battery electrode, comprising:
- coating a compound containing an electrode active material and a binder on a sheet collector using a coating die; and
- drying the compound to bond the collector and the compound,
- wherein in the coating, a laser light is emitted from a gap between the coating die and the collector to an interface between the compound and the collector, and
- wherein in the drying, a drying speed is set larger than a minimum speed where a migration occurs in the compound.

* * * * *